US012567033B2

(12) United States Patent
Schwarz et al.

(10) Patent No.: US 12,567,033 B2
(45) Date of Patent: Mar. 3, 2026

(54) SYSTEM FOR MANAGING STOCK OF A SHELF VIA NEAR FIELD RADIO COMMUNICATION

(71) Applicant: VusionGroup Deutschland GmbH, Ettenheim (DE)

(72) Inventors: Thomas Schwarz, Hohberg (DE); Michael Unmüßig, Ettenheim (DE)

(73) Assignee: VusionGroup Deutschland GmbH (DE)

( * ) Notice: Subject to any disclaimer, the term of this patent is extended or adjusted under 35 U.S.C. 154(b) by 108 days.

(21) Appl. No.: 18/289,630

(22) PCT Filed: May 6, 2022

(86) PCT No.: PCT/EP2022/062258
§ 371 (c)(1),
(2) Date: Nov. 6, 2023

(87) PCT Pub. No.: WO2022/234071
PCT Pub. Date: Nov. 10, 2022

(65) Prior Publication Data
US 2024/0242177 A1     Jul. 18, 2024

(30) Foreign Application Priority Data
May 7, 2021     (FR) ...................................... 2104863

(51) Int. Cl.
*G06Q 10/08*     (2024.01)
*G06Q 10/087*     (2023.01)
(Continued)

(52) U.S. Cl.
CPC ............. *G06Q 10/087* (2013.01); *H04B 5/72* (2024.01)

(58) Field of Classification Search
None
See application file for complete search history.

(56) References Cited

U.S. PATENT DOCUMENTS 10,922,649 B2 * 2/2021 Nakdimon ........... G06Q 10/087
2006/0163349 A1 7/2006 Neugebauer
(Continued)

FOREIGN PATENT DOCUMENTS

FR      3072492 A1     4/2019
WO     2005060698 A2     7/2005
(Continued)

OTHER PUBLICATIONS

International Search Report for Application No. PCT/EP2022/062258 mailed Aug. 31, 2022. 4 pages.
(Continued)

*Primary Examiner* — Lynda Jasmin
(74) *Attorney, Agent, or Firm* — Lerner David LLP

(57)     ABSTRACT
The invention relates to a system for managing stock of a shelf of a salespoint, comprising: —a communication module adapted to receive a far field order via far field radio communication, and to send a near field order via near field radio communication to at least one device (10-40) located within a transmission range of said communication module, wherein said communication module is adapted to be fixed to a shelf; and —at least one device (10-40) adapted to receive the near field order and to perform an action in response to the near field order.

16 Claims, 6 Drawing Sheets

(51) Int. Cl.
  H04B 5/72          (2024.01)
  H04W 52/02        (2009.01)

(56)                References Cited

U.S. PATENT DOCUMENTS

2007/0013479 A1      1/2007  Goel et al.
2020/0082454 A1*    3/2020  De Haas ............... G06Q 20/20

FOREIGN PATENT DOCUMENTS

WO        2005060698 A3      4/2007
WO        2010008378 A1      1/2010
WO        2018102575 A1      6/2018
WO      WO-2019073063 A1 *   4/2019   ............. G06Q 30/02
WO      WO-2020249251 A1 *  12/2020   ............. H02J 50/10
WO      WO-2021009244 A1 *   1/2021   ........... H04N 23/695

OTHER PUBLICATIONS

Preliminary Search Report for French Application No. FR 2104863 dated Dec. 10, 2021, pp. 1-2. (see p. 1, categorizing the cited references).

* cited by examiner

SYSTEM FOR MANAGING STOCK OF A SHELF VIA NEAR FIELD RADIO COMMUNICATION

CROSS-REFERENCE TO RELATED APPLICATIONS

The present application is a national phase entry under 35 U.S.C § 371 of International Application No. PCT/EP2022/062258 filed May 6, 2022, which claims priority from French Application No. 2104863 filed May 7, 2021, all of which are hereby incorporated herein by reference.

The present invention relates to a system for managing stock of a shelf of a salespoint, and a corresponding method for managing stock of a shelf. The shelf support is intended to receive merchandise and to be installed in a salespoint.

GENERAL TECHNICAL FIELD AND PRIOR ART

Merchandise is generally displayed in salespoints. Merchandise consists in articles of various natures, for example food or other goods, which can be bought by a customer in the salespoint. The salespoint comprises several aisles. Shelves, such as gondolas, are generally located at least on one side of an aisle, so that a customer walking in the aisle may easily see the merchandise displayed on the shelves.

A shelf generally comprises several shelf supports which are vertically spaced apart. Articles to be displayed are placed on the shelf supports. Articles of a given nature may be placed on the shelf supports one behind the other so as to form a line of articles. A shelf support comprises several adjacent lines of articles, each line corresponding to a given nature of article.

Adjacent columns of a shelf support can be delimited by spacers. The spacers extend generally along the whole length of the column, in order to physically separate the adjacent columns and help securing and positioning the articles inside each column. Thus, the articles may be positioned inside each column with accuracy and reliability, and in an orderly fashion. Several lines of articles can be accommodated abreast inside one column formed between two adjacent spacers.

Shelf labels are usually positioned on a front panel of the shelf support located under or next to a column delimited by the spacer, so as to be directly visible by a customer walking in an aisle in which the shelf is positioned. The shelf labels display information relative to the articles positioned in the nearby line(s), such as price, price per weight, name of the article, etc.

A particularly important issue for salespoints is the management of stock. Stock shortage leads to financial losses, as the out-of-stock article is not purchased by the client. Stock shortage should be anticipated so that fast replenishment can be accomplished if needed.

Electronic shelf labels (referred to below as "ESL") are a type of shelf labels which is commonly used in order to help manage stocks, in particular in order to regularly update a database of the stocks of the articles placed on the shelf supports of the salespoint, thus reducing the risk of stock shortage.

An ESL comprises a screen which allows automatic updates of the article information displayed on the screen, such as price updates. An ESL also classically comprises a light emitter configured to emit light according to a blinking sequence which is specific to the ESL, upon reception of a blinking order.

The salespoint comprises one or several base station(s). The base station(s) of the salespoint communicate(s) with the ESLs of the salespoint via far field radio communication, for example via a low power radio communication module of the base station. The base station(s) may thus occasionally transmit update orders to the ESLs so as to automatically update the ESLs information. The base station(s) may also occasionally transmit blinking orders to all ESLs, so as to trigger performing of their specific blinking sequences by the light emitters of all the ESLs of the salespoint.

Cameras may be installed in the salespoint in order to film the shelves and the ESLs positioned on the shelves. More specifically, a camera may be placed facing a shelf, on the other side of the aisle relative to the shelf, so as to film the shelf. The camera may thus detect a near-empty or an empty space on a filmed shelf support of the shelf, which correspond to a stock shortage area. The camera also acquires the blinking sequences performed by the light emitters of the ESLs positioned on the filmed shelf.

The nature of the out-of-stock article can thus be determined by identifying the ESL which is closest to the detected stock shortage area, the identification being performed based on the acquired blinking sequence which is specific to said ESL. An alert can then be generated, indicating to replenish the stock of the determined article.

However, this system for managing stock shortages only functions when ESLs are implemented. As a matter of fact, ESLs necessitate a dedicated infrastructure and a specific installation to be implemented. Thus, ESLs are not implemented in all salespoints, regions or countries, or even in all areas of a given salespoint. ESLs may for example be implemented only in areas of the store displaying products for which the stock management is most critical.

Furthermore, this system requires implementing and installing a dedicated infrastructure, more particularly relying on one or several base stations of the salespoint to transmit the orders to the ESLs. Such a dedicated infrastructure increases the costs associated with the stock management.

Finally, this system and method requires a lot of energy in order to allow an efficient stock management. Indeed, the update orders and blinking orders are transmitted by the base station(s) to all ESLs of the salespoint, via far field radio communication. For example, if the base station transmits a blinking order, then all light emitters of all ESLs of the salespoint perform their blinking sequences, and all the cameras film the shelves and acquire the blinking sequences so as to detect potential stock shortage. This method of stock management thus requires an important amount of energy in order to be effectively implemented.

GENERAL PRESENTATION OF THE INVENTION

An aim of the invention is to provide a system for managing stock of a shelf which requires less energy to operate.

Another aim of the invention is to provide a system for managing stock of a shelf which does not require the presence of ESLs.

According to a first aspect, the invention is directed towards a system for managing stock of a shelf of a salespoint, comprising:

a communication module adapted to receive a far field order via far field radio communication, and to send a near field order via near field radio communication to at least one device located within a transmission range of said communication module, wherein said communication module is adapted to be fixed to a shelf; and at least one device adapted to receive the near field order and to perform an action in response to the near field order.

Some preferred but not limitative features of the system described above are the following, taken individually or in combination:

the communication module is integrated in a camera, said camera being adapted to be fixed to the shelf;

the camera is adapted to visually acquire at least one of the at least one device;

the transmission range of the communication module is comprised between 1 and 10 meters, preferably between 4 and 7 meters;

the communication module and/or at least one of the at least one device is integrated in a spacer adapted to be fixed to a shelf support so as to delimit a column of said shelf support;

the system further comprises a battery adapted to supply power to the communication module and/or to the at least one device;

the at least one device comprises at least one among the following devices: an Electronic Shelf Label (ESL), a light emitter integrated in a spacer, a sensor and/or a camera;

the system further comprises a store access point configured to send a middle field order via middle field radio communication to at least one device located within a transmission range of said store access point;

the transmission range of the store access point is comprised between 10 and 80 meters, preferably between 30 and 50 meters.

According to a second aspect, the invention is directed towards a method for managing stock of a shelf of a salespoint, comprising the following steps:

S1: receiving, by a communication module, a far field order sent via far field radio communication by a base station, wherein said communication module is adapted to be fixed to a shelf;

S2: sending, by the communication module, a near field order via near field radio communication to at least one device located within a transmission range of said communication module;

S3: receiving, by said at least one device, the near field order; and

S4: performing, by said at least one device, an action in response to the near field order.

Some preferred but not limitative features of the method described above are the following, taken individually or in combination:

the transmission range of the communication module is comprised between 1 and 10 meters, preferably between 4 and 7 meters;

an action performed in step S4 comprises emitting, by at least one light emitter, light forming a signal corresponding to a blinking sequence which is specific to said light emitter and allows identification of the light emitter, wherein the method further comprises a step S5 of visually acquiring, by a camera, said blinking sequence;

the method further comprises a step S6 of receiving, by an identification unit, the blinking sequence acquired by the camera, and a step S7 of identifying, by the identification unit, the light emitter corresponding to the acquired blinking sequence, wherein said identification is performed based on a correspondence table comprising a plurality of blinking sequences, wherein each blinking sequence is associated with a respective light emitter in said correspondence table;

the method further comprises a step S8 of sending, by a store access point, a middle field order via middle field radio communication to at least one device located within a transmission range of said store access point, optionally wherein the transmission range of the store access point is comprised between 10 and 80 meters, preferably between 30 and 50 meters;

the method further comprises the following steps:

S100: entering, by the communication module, a wake mode at a predetermined wake instant, wherein the steps S1 of receiving the far field order and S2 of sending the near field order are performed by the communication module having entered the wake mode; and S500: entering, by the communication module, a sleep mode at a predetermined time interval after the predetermined wake instant, or after the device has performed an operation;

The method further comprises the following steps:

S200: communicating information, between a plurality of communication modules located within a transmission range from each other; and S300: determining which communication module(s) among said plurality of communication modules should be in a wake or in a sleep mode, depending on the communicated information, the received far field order and/or the near field order to send;

said near field order is broadcast by the communication module to all devices located within the transmission range of said communication module;

said near field order is selectively unicast or multicast by the communication module to one or several device(s) among the devices located within the transmission range of said communication module;

the method further comprises the following steps performed successively:

S21: sending, by the communication module, a wake-up order via near field radio communication to the at least one device;

S31: receiving, by the at least one device, the wake-up order;

S41: entering, by the at least one device, a wake mode, in response to the wake-up order;

S22: sending, by the communication module, an operation order via near field radio communication to the at least one device;

S32: receiving, by the at least one device, the operation order; and

S42: performing, by the at least one device, a corresponding operation, in response to the operation order;

the method further comprises the following steps performed successively:

S101: entering, by the communication module and the at least one device, a wake mode at substantially a same predetermined wake instant;

S22: sending, by the communication module, an operation order via near field radio communication to the at least one device, substantially at said predetermined wake instant;

S32: receiving, by the at least one device, said operation order, substantially at said predetermined wake instant; and S42: performing, by the at least one device, a corresponding operation, in response to the operation order;

The method further comprises the following steps, performed after step S22 and before step S32:

S23: entering, by the at least one device, a wake mode at periodic times spaced by a predetermined time interval; and S24: re-sending, by the communication module, the operation order, during a period of time which is equal to or greater than the predetermined time interval.

PRESENTATION OF THE FIGURES

Other features and advantages of the invention will emerge from the following description, which is purely illustrative and non-limiting and must be considered with respect to the appended figures in which.

DESCRIPTION OF SEVERAL EMBODIMENTS

Figure 1:
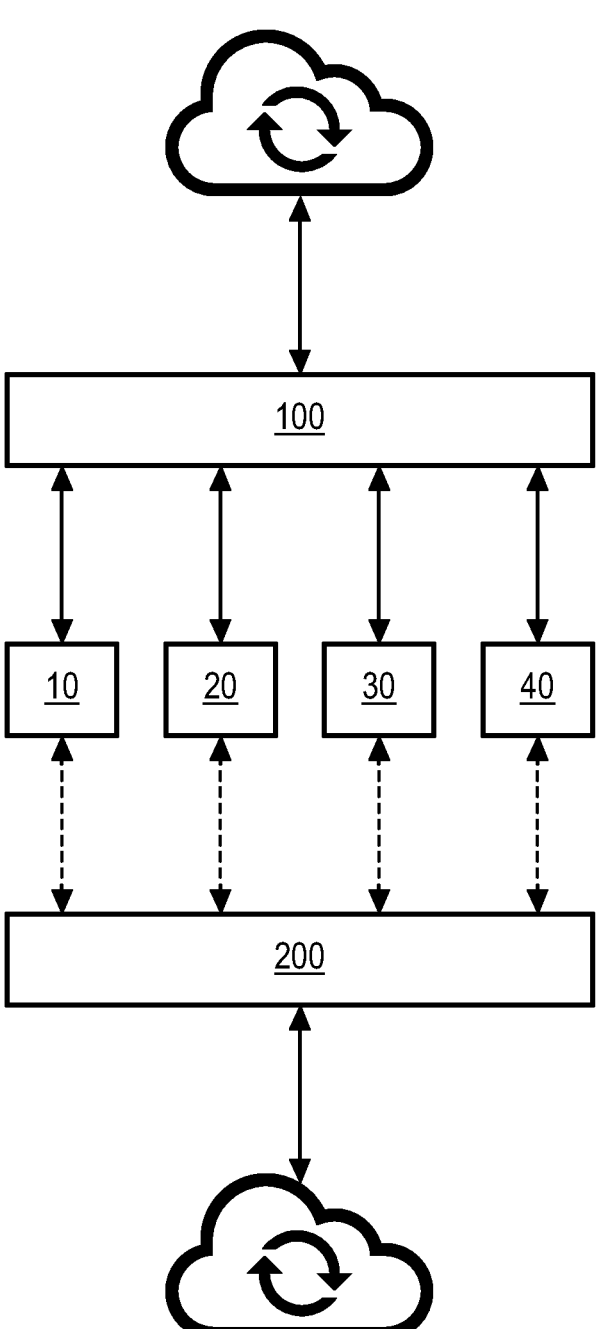
FIG. 1 is a block diagram of a system for managing stock of a shelf of a salespoint according to an embodiment of the invention.
Figure 2:
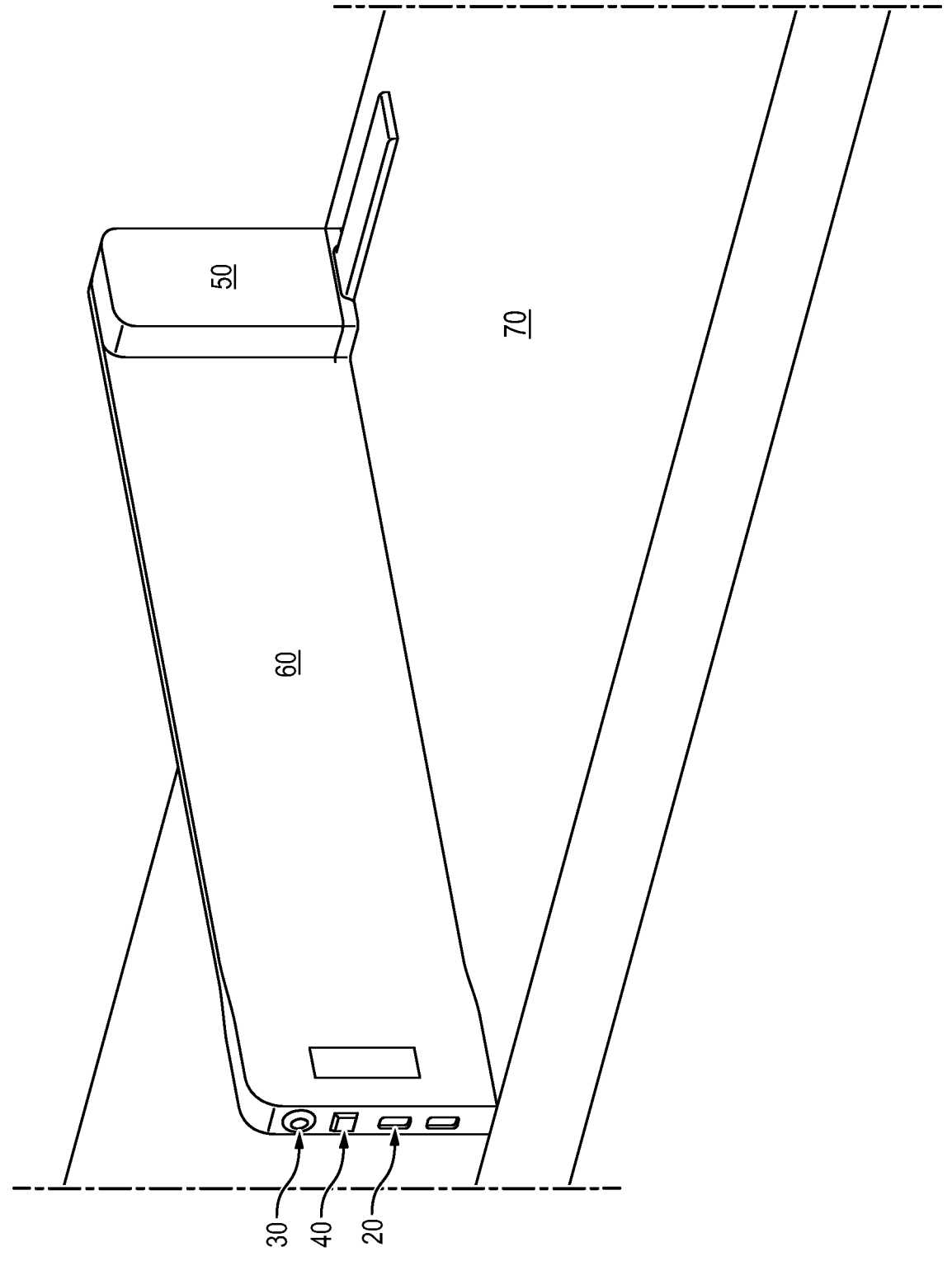
FIG. 2 is a perspective view of a system for managing stock of a shelf of a salespoint according to an embodiment of the invention.

A system for managing stock of a shelf of a salespoint, as illustrated by way of non-limiting example in FIGS. 1 and 2, comprises:

a communication module adapted to receive a far field order via far field radio communication, and to send a near field order via near field radio communication to at least one device 10-40 located within a transmission range of said communication module, wherein said communication module is adapted to be fixed to a shelf; and at least one device 10-40 adapted to receive the near field order and to perform an action in response to the near field order.

The device 10-40 may comprise at least one among the following devices: an Electronic Shelf Label (ESL) 10, a light emitter 20 integrated in a spacer 60, a sensor 40 (such as a person sensor or a motion sensor), a camera 30, etc. For example, the device receiving the near field order may include an ESL, or may include a light emitter 20 integrated in a spacer 60 and a camera 30.

The action may consist in at least one among the following actions:

entering a wake mode of the device 10-40;

emitting, by at least one light emitter 20, light forming a signal corresponding to a blinking sequence which is specific to said light emitter 20 and allows identification of the light emitter 20; the device 10-40 then includes a light emitter 20 configured to perform the blinking sequence in response to a blinking order;

visually acquiring images, more specifically visually acquiring a blinking sequence performed by a light emitter 20; the device 10-40 then includes a camera 30 configured to acquire images in response to an acquisition order;

acquiring sensing parameters, the device 10-40 then includes a sensor 40 configured to acquire sensing parameters in response to a sensing order;

receiving, by an identification unit, a blinking sequence acquired by a camera 30 and identifying, by the identification unit, the light emitter 20 corresponding to the acquired blinking sequence; the device 10-40 then includes an identification unit configured to receive the blinking sequence and identify the light emitter 20 in response to an identification order;

etc.

This system allows stock management without necessitating a dedicated infrastructure of the salespoint, as the near field orders are transmitted by the communication module via near field radio communication. Furthermore, the system is easy to install and does not necessitate the presence of ESLs to function. It can thus be implemented in salespoints, independently of the presence or absence of ESLs in the salespoint.

Furthermore, the system can be installed only in some areas of the salespoint, for example in areas displaying products for which stock management is most critical, such as areas selling fresh products, or depending on requirements made by brands to the retailer owning the salespoint.

The near field order is transmitted from the communication module to the device 10-40 via near field radio communication. Therefore, the transmission of the near field order uses a very low amount of power. The method is thus energy saving. The near field order triggers an action from the at least one device 10-40. The communication module operates as an access point. The action may for example be performed by the device 10-40 immediately upon receiving the near field order.

The communication module allows communication, more particularly sending the near field order, with one, several or all the devices 10-40 located within the transmission range of the communication module, and only such devices. Therefore, the system allows segmenting of the performing of an action by the devices 10-40 of a salespoint, depending of the area of the salespoint in which the device 10-40 is located. Only the devices 10-40 located within the transmission range perform the action in response to the near-field order, while the other devices 10-40 of the salespoint, located outside the transmission range, do not perform said action. In other words, this system selectively triggers the performing of an action by the devices 10-40 located at less than a certain distance of the communication module. The transmission range of the communication module can be adjusted according to a desired precision of the segmentation.

The system thus allows saving energy compared to an existing system where a base station 100 of the salespoint simultaneously triggers the performing of an action of all devices 10-40 of a given salespoint via a far field order. More particularly, if the device 10-40 is battery-powered, the battery 50 supplying power to the device 10-40 is saved, without necessitating prior binding or location awareness.

For example, if the device 10-40 includes a light emitter 20 and a camera 30, the system allows to trigger the performing of a blinking sequence by the light emitters 20 and/or the acquisition of said blinking sequence by the camera 30 only for the light emitters 20 and/or the cameras 30 located within the transmission range of the communication module. The other light emitters 20 and/or cameras 30 of the salespoint do not perform any action, thus the energy necessitated by the system to function is reduced compared to a system where all light emitters 20 of the salespoint perform the blinking sequences and all camera 30 acquire said blinking sequences.

Furthermore, the system allows multiple action scenarios per day, depending on which communication modules in the salespoint transmit the near field orders and which do not. For example, multiple scenarios corresponding to blinking orders sent at different times by different communication modules to light emitters 20 located in specific areas of the salespoint can be parameterized.

In addition, the communication module is adapted to be fixed to a shelf. The communication module is thus a fixed communication module, that is to say that the communication module is mounted in a fixed relationship relative to the shelf. The positioning of the communication module relative to the shelf is therefore precise and reliable. The system can therefore perform stock management automatically, via near field communication, without necessitating an operator with a mobile terminal to walk in the aisles in order to get close enough to send corresponding orders to the devices 10-40.

Furthermore, the communication module is easily installed on the shelf, and requires no dedicated infrastructure to be operational. More particularly, the system does not require the presence of ESLs to be operational.

A salespoint may comprise one or several aisles forming passages for customers of the salespoint. A shelf may be located in an aisle of the salespoint. The shelf may comprise one shelf support 70, or several shelf supports 70 which are vertically spaced apart from each other. A shelf support 70 is adapted to accommodate shelf labels, which can be ESLs.

The salespoint may comprise at least one base station 100 comprising a far field communication module. The base station 1000 may be a salespoint base station 100, or may be a cloud hub. The salespoint may comprise one, two or more base stations 100, according for example to dimensions of the salespoint.

The base station 100 may be adapted to transmit a far field order to all the devices 10-40 of the salespoint, to as to immediately trigger the performing of a corresponding action by all the devices 10-40 of the salespoint.

A shelf support 70 may be a substantially planar shelf support 70 extending in a shelf support 70 plane. The shelf support 70 plane is defined by a lateral direction and by a longitudinal direction, the longitudinal direction being perpendicular to the lateral direction. A vertical direction corresponds to a direction perpendicular to shelf support 70 plane. A length corresponds to a dimension along the longitudinal direction. A width corresponds to a dimension along the lateral direction. A height corresponds to a dimension along the vertical direction.

Articles to be displayed are placed on the shelf supports 70. Articles of a given nature may be placed on the shelf supports 70 one behind the other in the longitudinal direction so as to form a line of articles. A shelf support 70 comprises several adjacent lines of articles, each line corresponding to a given nature of article which may be the same or different from a nature of articles of an adjacent line of articles.

More specifically, shelves may be located on each side of an aisle, the shelves being opposite to each other relative to the aisle, so that the shelves are located on both sides of a customer walking in the aisle. The customer walking in the aisle may thus chose articles displayed on the shelves, on either side of the customer.

The communication module is a radio beacon adapted to send and receive radio signals via very low power radio communication.

The communication module comprises a near field radio communication module adapted to communicate with devices 10-40 located within the transmission range of the near field radio communication module.

The transmission range of the near field radio communication module may be comprised between several centimeters to several meters, more specifically may be comprised between 1 meter and 15 meters, for example between 3 meters and 10 meters, preferably between 4 meters and 7 meters. Thus, all devices 10-40 located within 0 meters and the value in meters of the transmission range can receive the near field orders sent by the communication module. For example, if the transmission range is equal to 6 meters, then all devices 10-40 located within a radius of 6 meters from the communication module may receive the near field orders.

The near field radio communication module can allow RFID (Radio Frequency Identification) type communication with the devices 10-40 within the transmission range.

The nature and/or time intervals between two near field orders sent by the communication module can be adjusted according to the nature of the articles located in the transmission range of the communication module, in order to more efficiently manage the risk of stock shortage while reducing costs of the stock management. For example, the communication module can be configured to transmit blinking orders to devices 10-40 in the form of light emitters 20 at closer time intervals if fresh articles are located within the transmission range of the communication module, as such fresh articles have a higher stock shortage risk than other articles.

The near field order may be sent by the communication module depending on the far field order. For example, the number and/or nature of the near field order may be determined by the communication module depending on the far field order received by said communication module.

In a first example, the communication module may be configured to broadcast the near field order to all devices 10-40 located within the transmission range of said communication module. This way, a near field order can potentially be receive by all devices 10-40 located within the transmission range. A near field order can for example be broadcast when the system checks for new devices 10-40, so that the communication module knows with which devices 10-40 it can communicate.

In a second example, which is compatible with the first example, the communication module may be configured to selectively unicast or multicast the near field order to one or several device(s) 10-40 among the devices 10-40 located within the transmission range of said communication module.

A near field order can for example be unicast, that is to say sent to only one device 10-40, or multicast, that is to say sent to a selection of several devices 10-40 among the plurality of devices 10-40 located within the transmission range. Unicasting or multicasting can for example be achieved based on identification information of the devices 10-40 located within the transmission range of the communication module.

This way, a near field order can be selectively sent to only one or some of the devices 10-40 among the devices 10-40 located within the transmission range. A near field order can for example be unicast or multicast when it is desired to be sent to only a selection of device(s) 10-40, for example when only one camera 30 within the transmission range of the communication module should be woken in order to avoid double acquisition of the blinking sequences of the light emitters 20, or when the blinking sequences of only some light emitters 20 within the transmission range should be triggered.

The near field order may for example include a wake-up order and/or an operation order. The wake-up order is adapted to wake the devices 10-40 located within the transmission range and/or make said devices 10-40 perform a given operation.

The communication module comprises a far field radio communication module adapted to receive a far field order. The far field communication module may be a wireless communication module such as a Wi-fi module, a 4G module such as an LTE module, and/or a 5G module, allowing to get a cloud signal via mobile technologies. Alternatively, the far field communication module may be a wire communication module such as a PoE module with an ethernet cable, corresponding to a local store technology. Alternatively, the far field communication module may be a local store Wi-Fi module.

The far field radio communication module allows command of the communication module along important distances, for example a centralized control of all communication modules of the salespoint by the base station 100 of the salespoint. The communication module may communicate with the base station 100 of the salespoint, in particular may receive far field orders from the base station 100. The communication module may also be adapted to send information, such as feedback or orders, to the base station 100 via far field radio communication.

The far field order may correspond to an order for the communication module to wake the devices 10-40 located within the transmission range and/or make said devices 10-40 perform a given operation.

The communication module may be configured to alternate between a wake mode and a sleep mode. In the sleep mode, the energy consumption of the communication module is reduced.

In the wake mode, the communication module may communicate with the base station 100 to ask the base station 100 for far field orders, may receive the far field order sent by the base station 100, and/or may send the near field order to the at least one device 10-40.

The communication module may be configured to enter the sleep mode at a predetermined time interval after having entered the wake mode, or after the device 10-40 has performed an operation. The communication module is thus configured to remain in the wake mode for a given predetermined period of time, or until an action is performed by the device 10-40, then to switch back to the sleep mode.

Such an alternance of the communication module between sleep and wake mode allows to further reduce the energy consumption of the system.

The device 10-40 may be configured to alternate between a wake mode and a sleep mode. In the sleep mode, the energy consumption of the device 10-40 is reduced.

In the sleep mode, the device 10-40 is adapted to receive a wake-up order, for example a wake-up order sent via near field radio communication by the communication module. The device 10-40 is adapted to enter the wake mode in response to the wake-up order, for example immediately upon receiving the wake-up order. Alternatively, or in addition, in the sleep mode, the device 10-40 may be configured to switch to the wake mode at predetermined instants.

In the wake mode, the device 10-40 is adapted to receive an operation order, for example a near field order corresponding to an operation to perform by the device 10-40, the near field operation order being sent via near field radio communication by the communication module.

In the wake mode, the device 10-40 is adapted to perform a corresponding operation in response to said operation order, for example immediately upon receiving the operation order.

For example, if the device 10-40 is a light emitter 20, the light emitter 20 emits no light in the sleep mode. In the wake mode, the light emitter 20 can emit light in the form of the blinking sequence in response to a blinking order sent for example by the communication module.

The device 10-40 is configured to enter the sleep mode at a predetermined time interval after having entered the wake mode, or after the device 10-40 has performed an operation. The device 10-40 is thus configured to remain in the wake mode for a given predetermined period of time, or until an action is performed by the device 10-40, then to switch back to the sleep mode.

Such an alternance of the communication module between sleep and wake mode allows to further reduce the energy consumption of the system.

In a first embodiment, the device 10-40 is configured to enter the wake mode in response to a wake-up order, for example a near field order corresponding to a wake-up order sent by the communication module.

The communication module may be configured to enter the wake mode at predetermined time intervals, for example every 30 minutes, then to send a wake-up order so as to wake the device 10-40, then to send an operation order so as to trigger performing of a given operation by the device 10-40. The wake-up order and/or the operation order may be broadcast, or may be selectively unicast or multicast by the communication module.

In a second embodiment, the at least one device 10-40 and the communication module are configured to respectively enter a wake mode at substantially a same predetermined wake instant. The communication module may send an operation order via near field radio communication to the at least one device 10-40, substantially at said predetermined wake instant. The device 10-40 may receive said operation order substantially at said predetermined wake instant and perform the corresponding action in response to the operation order.

Thus, the device 10-40 and the communication module wake up at synchronized instants to communicate. This second embodiment allows to further reduce the energy consumption of the system and thus to maximize the lifetime of the battery 50 supplying power to the device 10-40 and/or to the communication module. This second embodiment also allows to selectively send the operation order to the device 10-40, depending on the predetermined wake instant. Indeed, the operation order, even if it is broadcast by the communication module to all devices within the transmission range, will only be received by the devices 10-40 which are in the wake mode at said predetermined wake instant. This second embodiment is particularly preferred if the client devices 10-40 are known.

In this second embodiment, the device 10-40 and the communication module may both include a respective clock. The predetermined instant may be determined with a precision substantially of a second, or of a millisecond.

In this second embodiment, the device 10-40 may be configured, to, if it has not received an operation order substantially at said predetermined instant, enter the wake mode at periodic times spaced by a predetermined time interval. The communication module is configured to re-send the operation order during a period of time which is equal to or greater than the predetermined time interval. Thus, if the device 10-40 has not entered the wake mode substantially at the predetermined instant, for example because of a too-low battery 50 at said predetermined instant, an error, or if the device 10-40 entered the wake mode too early or too late (that is to say outside of the required precision), or if the communication module has not sent the operation order at the predetermined instant, the operation order can then still be received by the device 10-40 at an ulterior moment.

For example, the device 10-40 can then enter the wake mode every 3 seconds, the communication module being configured to send the operation order during a duration which is equal to at least 3 seconds, so that the operation order will be received by the device 10-40.

The system may comprise a plurality of communication modules. Communication modules located within a transmission range from each other may be configured to communicate information. In other words, communication modules having transmission ranges which overlap with one another may communicate with one another.

Said communication modules located within a transmission range from each other may be configured to determine which communication module(s) among said plurality of communication modules should be in a wake or in a sleep mode, depending on the communicated information, the received far field order and/or the near field order to send. Thus, the transmission of the near field orders to the devices 10-40 can be optimized, so as to reduce energy consumption of the system.

Communication modules located within a transmission range from each other, for example communication modules located on opposite sides of a given aisle of the salespoint, may be configured to enter the wake mode at synchronized time intervals so as to communicate said information.

For example, if the devices 10-40 include one or several light emitters 20 and/or one or several cameras 30, the plurality of communication modules may determine, based on the exchanged information, which communication module(s) should send the blinking order and/or the acquisition order to the light emitters 20 and/or to the cameras 30.

It may be desirable to wake up and trigger performing of a blinking sequence of a given light emitter 20 only once, as each blinking sequence performed uses energy. Similarly, it may be desirable to wake-up and trigger acquisition of a given blinking sequence by only one camera 30, so as to reduce double acquisition and thus optimize energy consumption of the cameras 30, as each acquisition of images uses energy. It may also be desirable to make sure that at least one camera 30 having a given light emitter 20 in its field of view is woken to acquire the blinking sequence of the given light emitter 20, so as to avoid a blinking sequence being performed without being acquired.

For example, if the light emitters 20 are located on both sides of the aisle, one camera 30 on one side of the aisle and one camera 30 on the other side of the aisle can be woken so as to acquire the blinking sequences of the light emitters 20 on both sides of the aisle, in order to optimize energy consumption.

The communication module may be integrated in a shelf sensor such as a temperature sensor, a motion sensor, or a distance sensor. The communication module and/or at least one of the at least one device 10-40 may be integrated in a spacer 60 adapted to be fixed to a shelf support 70 so as to delimit a column of said shelf support 70. When both the communication module and the device 10-40 are integrated in the spacer 60, the spacer 60 integrating the device 10-40 may correspond to the spacer 60 integrating the communication module, or to another spacer 60, fixed on the same or on another shelf support 70.

A spacer 60 fixed on the shelf support 70 is adapted to extend substantially perpendicularly to the shelf support 70 plane, for example along the whole length of the shelf support 70. The spacer 60 delimits a column of the shelf support 70, that is to say delimits an area of the shelf support 70 where articles 200 are to be displayed.

As the spacer 60 is fixed to the shelf support 70, a position of the spacer 60 relative to said shelf support 70 is known. A position of the spacer 60 in the salespoint may also be known. The spacer 60 may contain one or several line(s) of articles arranged abreast on the spacer 60. Two adjacent lines of articles displayed on the spacer 60 may contain articles of a same nature or of different natures.

The nature of an article may correspond to a type of article and/or to a brand of the article, for example a specific cream, cereals, a specific vegetable, etc. The nature(s) and position (s) of the articles displayed in a column delimited by the spacer 60 relative to said spacer 60 is also known, said articles being associated with the spacer 60. Thus, the spacer 60 defines the nature and the position of the articles located in the column delimited by the spacer 60.

Furthermore, the spacer 60 is easily installed on the shelf support 70, like a conventional spacer 60, and requires no dedicated infrastructure to be operational. More particularly, the spacers 10 do not require the presence of ESLs to be operational. The dimensions of the spacer 60 substantially correspond to the dimensions of a conventional spacer 60, which allows to save space. One or more spacers 10 are fixed on the shelf support 70 so as to delimit columns of the shelf support 70.

According to a first example, the spacer 60 fixed on the shelf support 70 comprises a plate adapted to be stacked on the shelf support so as to delimit the column of the shelf support 70.

The spacer plate 60 may be a rectangular plate adapted to extend mainly in the longitudinal and the lateral direction, that is to say in a plane substantially parallel to the shelf support plane. A dimension of the spacer plate 60 in the lateral direction corresponds to the column width. Two adjacent spacer plates 60 may be arranged side by side and in contact with each other so as to delimit two adjacent columns of the shelf support 70.

The spacer plate 60 may present a height in the vertical direction which is sufficient to integrate components of the spacer plate 60, the spacer plate 60 forming a substantially rectangular block. The spacer plate 60 thus forms a stable casing, for fresh and normal environments, the casing being furthermore adapted to integrate components of the spacer plate 60.

The spacer plate 60 is stacked on the shelf support 70. The spacer plate 60 may be adapted to extend along the whole length of the shelf support 70. Articles of a given column delimited by the spacer plate 60 are displayed on the spacer plate 60 in one or several line(s) of articles arranged abreast on the spacer plate 60. The articles displayed on the spacer plate 60 correspond to the articles associated with the spacer plate 60. The nature and/or position of the articles associated with the spacer plate 60 relative to the spacer plate 60 is thus known.

Figure 3:
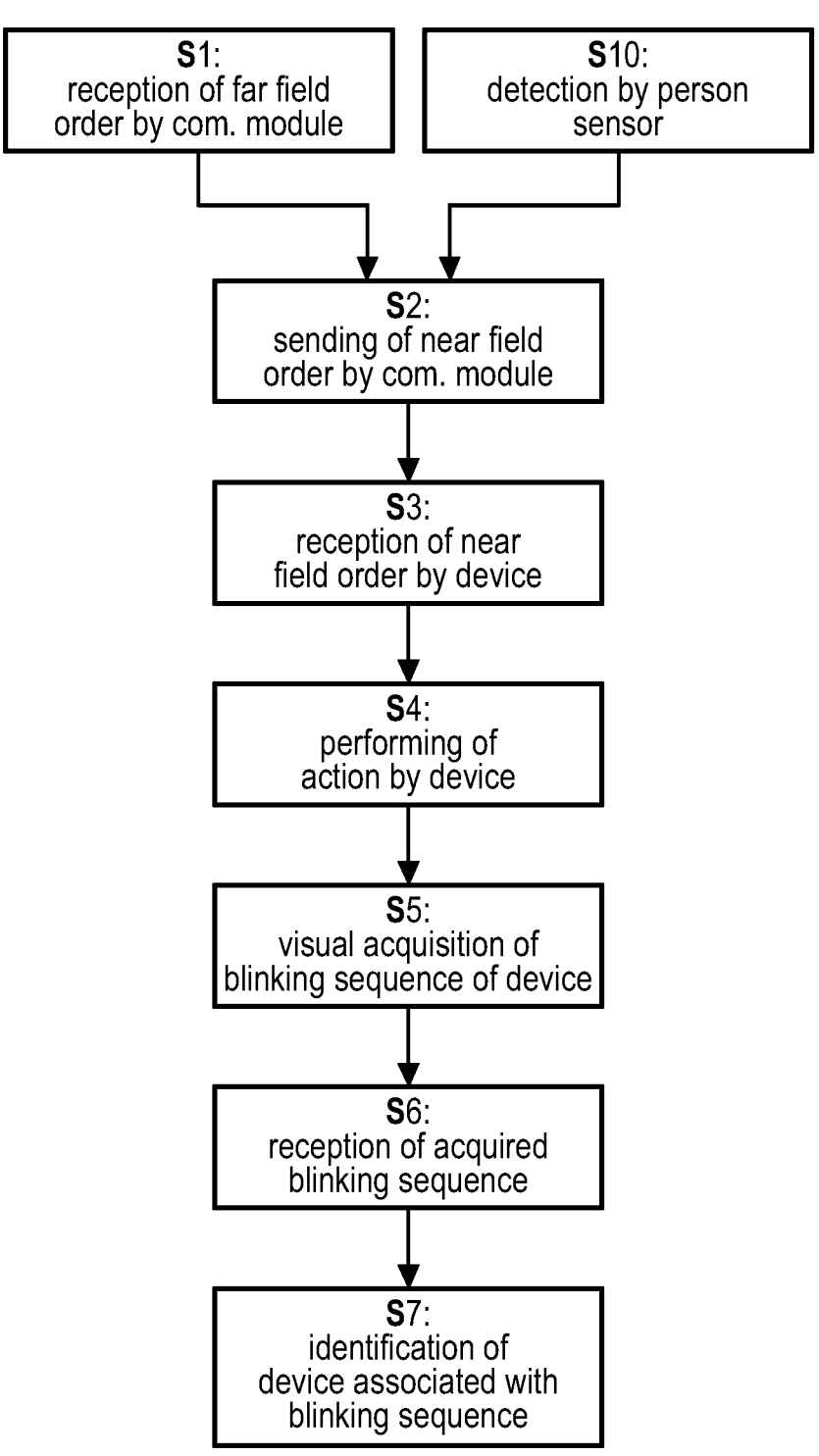
FIG. 3 is a block diagram of a method for managing stock of a shelf of a salespoint based on near field radio communication according to an embodiment of the invention, wherein the method further comprises identification of the device, in the form of a light emitter, based on visual acquisition of the blinking sequence of the light emitter.
Figure 5:
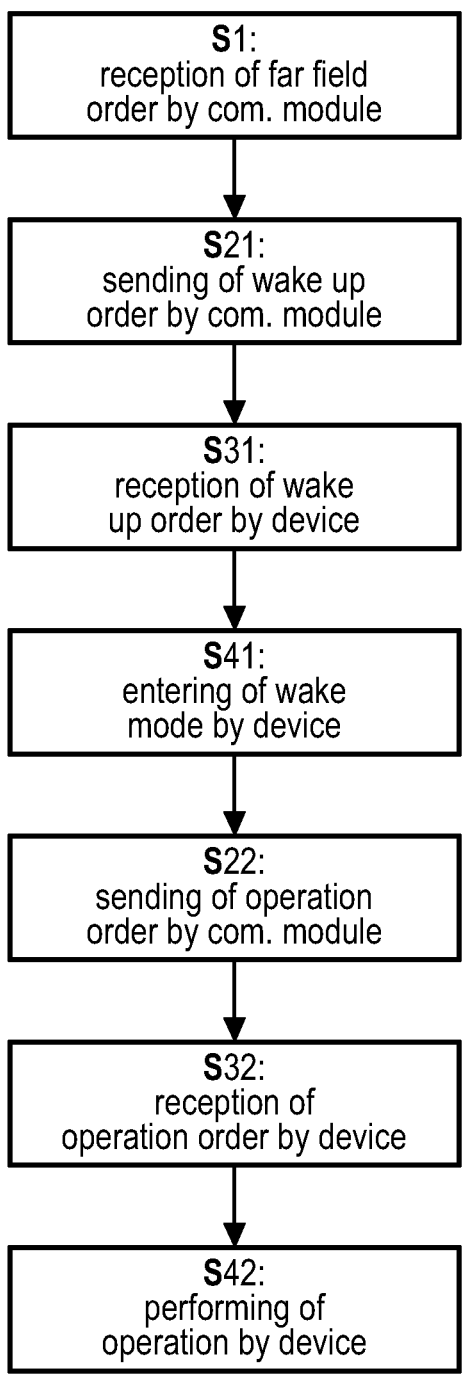
FIG. 5 is a block diagram of a method for managing stock of a shelf of a salespoint according to a first embodiment of the invention, wherein the device is configured to enter the wake mode in response to a wake-up order sent by the communication module and to perform an operation in response to an operation order sent by the communication module.
Figure 6:
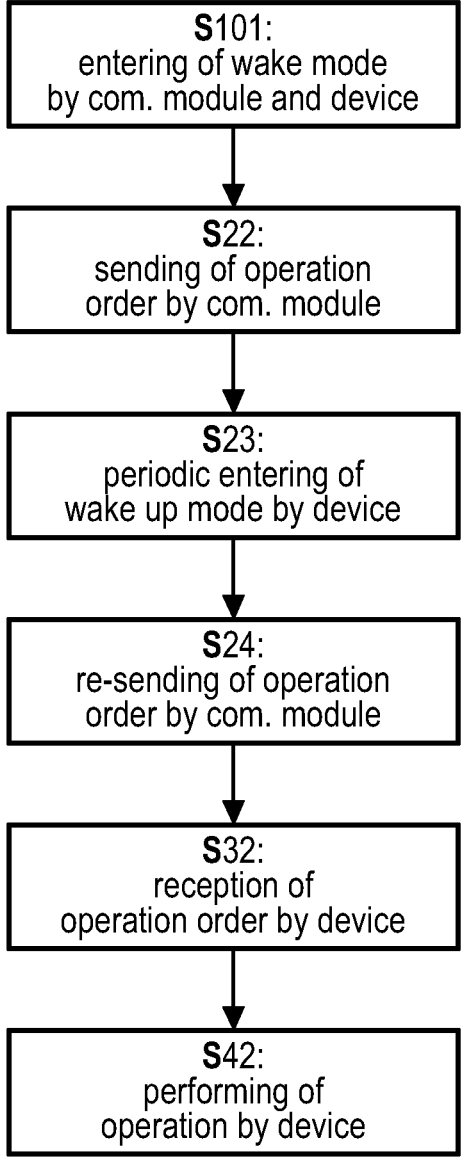
FIG. 6 is a block diagram of a method for managing stock of a shelf of a salespoint according to a second embodiment of the invention, wherein the device and the communication module are configured to respectively enter a wake mode at substantially a same predetermined instant.

According to a second example, illustrated by way of example in FIGS. 3, 5 and 6, the spacer 60 fixed on the shelf support 70 is adapted to delimit two adjacent columns of the shelf support 70. The spacer 60 extends mainly in the longitudinal and in the vertical direction of the shelf support 70, substantially perpendicularly to the shelf support plane. The spacer 60 may be adapted to extend along the whole length of the shelf support 70. The spacer 60 presents a height which is sufficient to delimit the two adjacent columns of the shelf support 70. Thus, articles located in a column on one side of the spacer 60 cannot move towards the adjacent column on the other side of the spacer 60 without intentional manual manipulation by a user. The spacer 60 laterally delimits the two adjacent columns, the two columns being located on each side of the spacer 60.

The spacer 60 may comprise a partition wall adapted to delimit the two adjacent columns of the shelf support 70, the partition wall comprising two opposite side panels, and a front panel adapted to connect the two opposite side panels of the partition wall. The side panels of the spacer 60 may extend substantially in the longitudinal and the vertical direction. Each side panel of the spacer 60 faces each adjacent column delimited by the spacer 60. The architecture of the spacer 60, comprising the opposite side panels connected by the front panel, forms a stable casing, for fresh and normal environments, the casing being furthermore adapted to integrate components of the spacer 60.

A distance between the two opposite side panels of the spacer 60 corresponds to a width of the spacer 60. The width of the spacer 60 may vary in the longitudinal direction and may be sufficient to integrate one or several component(s) between the two opposite side panels of the spacer 60. The component(s) integrated in the spacer 60 may include one or several device(s) 10-40 (such as a light emitter 20, a sensor 40 and/or a camera 30), and/or may include an identification unit, a communication module, an LCD screen, and/or a battery 50.

The component(s) integrated in the spacer 60 according to the first example or the second example may include one or several device(s) 10-40 (such as a light emitter 20, a sensor 40 and/or a camera 30), and/or may include an identification unit, a communication module, an LCD screen, and/or a battery 50. The position of the spacer 60 relative to said shelf support 70, as well as the nature and position of the articles displayed in the column delimited by the given spacer 60, are known, said articles being associated with said given spacer 60. Thus, once a spacer 60 is identified, for example based on the blinking sequence of a device in the form of a light emitter 20 integrated in the spacer 60 or of an ESL 10 placed substantially under the spacer 60, the ESL 10 comprising a light emitter 20, the nature and position of the articles associated with the spacer 60 can also be correctly identified.

The device 10-40 may include an ESL 10. The ESL 10 may include a light emitter 20. The ESL 10 is fixed to the shelf support 70, a position of the ESL 10 relative to said shelf support 70 is known. A position of the spacer 10 in the salespoint may also be known. A nature and a position of the articles displayed in the column adjacent the ESL 10 is also known, said articles being associated with the ESL 10.

Alternatively, the device 10-20 may include a light emitter 20 integrated in a spacer 60. The light emitter 20 may be integrated in the front panel of the spacer 60. The front panel of the spacer 60 is visible by a person or an imaging device 10-40 facing the shelf where the spacer 60 is installed, no matter how full the line of articles is. Therefore, a light emitter 20 integrated in the front panel is visible by a camera 30 facing the shelf.

The light emitted by the light emitter 20 forms a signal corresponding to a blinking sequence. In other words, the light emitter 20 is adapted to flash to emit several light pulses, thereby performing a blinking sequence. The several light pulses have different durations and are spaced from each other by variable time intervals. The durations of and time intervals between the signal formed by the sequence of light pulses is specific to the light emitter 20, that is to say characterizes the light emitter 20. Thus, the blinking sequence of the light emitter 20 is distinctive of the light emitter 20 and allows identification of the light emitter 20.

The performing of a blinking sequence of light pulses by the light emitter 20 may be triggered by a near-field order corresponding to a blinking order transmitted to the light emitter 20 by the communication module. The blinking order can immediately trigger the blinking sequence, in which case the light emitter 20 performs the blinking sequence as soon as the light emitter 20 receives the blinking order.

The light emitter 20 may be a LED. The light emitter 20 may be configured to emit a visible light, for example a green light, or may be configured to emit an infrared light so that the light emitted by the light emitter 20 is not visible by the human eye.

The blinking sequence of the light emitters 20 may be configured so that in a given salespoint, or in a given area of the salespoint, more specifically in a given area defined by the transmission range of a given communication module, or in an area corresponding to a field of view of a same camera 30, each light emitter 20 located in said given area has a unique specific blinking sequence which is different from the blinking sequences of the other light emitters 20 located in said given area. In other words, several light emitters 20 installed in a same salespoint may have identical blinking sequences, as long as the blinking sequences of the light emitters 20 installed within a same transmission range of a given communication module are different from each other, or as long as the blinking sequences of all light emitters 20 visible by a given camera 30 are different.

Thus, the light emitters 20 of said given area of the salespoint can easily and reliably be identified based on their blinking sequence.

The device 10-40 may include a sensor 40, more specifically a person sensor 40. The person sensor 40 is adapted to detect an object or a person placed in the vicinity of the person sensor 40.

The person sensor 50 may include one or a combination of any of the following sensors: a motion sensor adapted to detect a movement in the field of view of the sensor, a camera adapted to acquire images of the field of view of the sensor, an ambient sensor adapted to detect an amount of light in the vicinity of the sensor, and/or a depth sensor adapted to enrich a camera's information with depth data.

The person sensor 40 may be integrated in a spacer 60, the spacer 60 also integrating a light emitter 20. Therefore, the object or person obstructing a view of the person sensor 40 also obstructs a view of the light emitter 20 of the spacer 60. This may happen when a customer is looking at articles of the support shelf on which the spacer 60 is fixed.

The communication module may be adapted to send a near field order corresponding to a sensing order so as to trigger a detection by the person sensor 40 of an object or person obstructing a view of a camera 30.

The communication module may be adapted to send a near field order corresponding to a blinking order to a light emitter 20 according to an output of the person sensor 40. More specifically, the communication module may be adapted delay triggering the blinking sequence of the light emitter 20 until a moment when the person sensor 40 detects no object or person obstructing a view of the light emitter 20. The triggering of the blinking sequence is thus delayed until a camera 30 can acquire an unobstructed view of the blinking sequence. Therefore, the blinking sequence is not performed uselessly when it cannot be acquired by the camera 30 due to the presence of a person or object obstructing the camera 30's view of the light emitter 20.

The person sensor 40 allows to improve the efficiency and reduce the energy consumption of the system for stock management. The battery life of the battery 50 supplying power to the light emitter 20 and/or to the camera 30 is prolongated, and the reliability of the acquisition of the blinking sequence is increased.

The system may comprise a camera 30. The camera 30 may correspond to a device 10-40. Alternatively, or in addition, the camera may integrate a communication module.

The camera 30 is adapted to visually acquire at least one of the at least one device 10-40, in particular in response to an acquisition order which may be sent by the near field communication module. The camera 30 may be positioned and fixed on a wall or a ceiling of the salespoint. Alternatively, the camera 30 may be adapted to be fixed to a shelf or a shelf support 70. Optionally, said camera 30 is integrated in a spacer 60 adapted to be fixed to a shelf support 70 so as to delimit a column of said shelf support 70. The spacer 60 integrating the camera 30 is referred to as a monitoring spacer 60. When the camera 30 is integrated in a spacer 60, the positioning and fixing of the camera 30 is precise and reliable, and the camera 30 does not require to be positioned manually by a user. The camera 30 may more specifically be integrated in a front panel of the monitoring spacer 60.

The camera 30 may be adapted to acquire a visible and/or an infrared light, corresponding to a light emitted by the light emitter 20.

The camera 30 may be a 12MP camera 30.

The camera 30 may comprise a motorized lens allowing to change a viewing direction of the camera 30, that is to say a direction along which the field of view of the camera 30 is substantially orientated. Thus, the field of view of the camera 30 may be adjusted according to the desired application. For example, the lens of the camera 30 may be rotated around one or several rotation axes so as to change the viewing direction. The viewing direction of the camera 30 may be adapted to be manually adjusted by a user and/or may be adapted to be automatically adjusted by an actuator integrated in the camera 30.

For example, the viewing direction of the camera may be substantially oriented along a direction which is perpendicular to a wall, shelf, shelf support 70, or spacer 60 to which the camera 30 is fixed, and/or may be changed by rotation around one or more axes of rotation.

The camera 30 may comprise a very close field communication module adapted to communicate with a terminal located very close to the camera 30, for example via NFC. A transmission range of the very close field communication module may for example be equal to a few centimeters, more particularly may be comprised between 1 cm and 10 cm. This very short range of communication increases the precision and security of the communication between the camera 30 and the mobile terminal.

The camera 30 may be adapted to acquire images substantially continuously or at discrete time intervals.

The camera 30 may be configured to acquire the blinking sequence of a device 10-40 corresponding to a light emitter 20 integrated in a spacer 60 mounted on a shelf support 70, the light emitter 20 of said spacer 60 being located in a field of view of the camera 30. The blinking sequence acquired by the camera 30 may consist in a plurality of images including the light emitter 20, the images being taken at a time interval which is sufficiently short so that the parameters of the blinking sequence, such as the number of flashes and the duration of each flash, may be determined based on the acquired images.

The camera 30 may further be adapted to acquire images of the shelves and/or shelf supports 70 located in the field of view of the camera 30. The camera 30 may thus detect a near-empty or an empty space on a shelf support 70 in the field of view of the camera 30, which correspond to a stock shortage area.

The camera 30 may thus be positioned so as to acquire images of a spacer 60 and/or a shelf support 70. More specifically, the camera 30 may be placed facing the spacer 60 and the shelf support 70, on the other side of the aisle relative to the spacer 60 and the shelf support 70, in order to best acquire images of said spacer 60 and/or shelf support 70. Thus, the camera 30 may efficiently acquire blinking sequences of the light emitter 20 integrated in the spacer 60, and/or may efficiently detect a near-empty or an empty space on the shelf support 70.

When the camera 30 is integrated in a monitoring spacer 60, the camera 30 directly faces the opposite light emitters 20 and the opposite shelf supports 70 located on the other side of the aisle. Furthermore, the camera 30 is located at substantially a same height as the opposite shelf support 70 and light emitters 20. Therefore, the camera 30 efficiently acquires images of the opposite shelf supports 70 and light emitters 20, the acquired image corresponding substantially to what a customer choosing an article to buy sees.

Cameras 30 may be integrated in only some spacers 60 of a shelf. Thus, only some spacers 60 of the shelf are monitoring spacer. For example, 1 spacer out of a number ranging between 10 and 50, for example 1 spacer out of 18, may be a monitoring spacer 60 integrating a camera 30. One camera 30 integrated in one monitoring spacer 60 is adapted to acquire the blinking sequences of all the light emitters 20 located in the field of view of the camera 30. Thus, the costs of the stock management are reduced, while still allowing an efficient acquiring of the blinking sequences of the light emitters 20 and of the shelf supports 70.

The communication module may be integrated in the camera 30, said camera 30 being adapted to be fixed to the shelf. The communication module is then a miniaturized communication module and the camera 30 thus forms an access point of the system, may function as an IoT hub. The transmission range may allow the communication module of a camera 30 to send the near field order to a device 10-40, such as a light emitter 20, located on the other side of an aisle, without sending the near field order to all the devices 10-40 of the salespoint.

The system may further comprise a battery 50 adapted to supply power to the communication module and/or to the at least one device 10-40. The battery 50 may be fixed to the shelf. The battery 50 may be integrated in the spacer 60 and/or fixed to the spacer 60, so as to supply power to at least one component integrated in the spacer 60.

The system may further comprise an identification unit. The identification unit may be integrated in the spacer 60, or in the base station 100. The identification unit is adapted to receive a blinking sequence emitted by the light emitter 20 of the spacer 60 and acquired by the camera 30. The camera 30 may be adapted to send the acquired blinking sequence to the identification unit, for example by near field radio communication.

The identification unit is further adapted to identify the light emitter 20 corresponding to the acquired blinking sequence, more specifically to identify the spacer 60 in which said light emitter 20 is integrated. The identification of the spacer 60 corresponding to the acquired blinking sequence may be performed based on a correspondence table comprising a plurality of blinking sequences. Each blinking sequence is associated with a respective spacer 60 in said correspondence table. The identification unit may comprise a memory adapted to store the correspondence table, and a processor adapted to associate to the acquired blinking sequence the corresponding spacer 60.

The system may further comprise a middle field access point 200 configured to send a middle field order via middle field radio communication to at least one device 10-40 located within a transmission range of said middle field access point 200.

The middle field radio communication allows the access point 200 to communicate with the devices 10-40 independently from the communication module. The access point 200 is thus an additional radiofrequency layer, implemented in addition to the near field radio communication module and the far field radio communication module of the communication module. The middle field radio communication has a higher output power, that is to say antenna strength, than the near field radio communication module of the communication module.

Such a middle field access point 200 configured to communicate via middle field radio communication is used for instantaneous transmission of an order to the devices 10-40 of the salespoint, that is to say when it is needed to communicate instantly with said devices 10-40. Such real-time communication needs may correspond to specific applications, for example triggering immediate blinking sequences of the light emitters 20 for instantaneous supply check.

The transmission range of the middle field access point 200 may be comprised between 10 and 80 meters, preferably between 30 and 50 meters.

The middle field access point 200 may be adapted to communicate with the base station 100, more specifically to receive a far field order from the base station 100.

The middle field access point 200 may be connected to a permanent power supply. Alternatively, a battery 50 may supply power to the middle field access point 200.

The middle field access point 200 may be integrated in a spacer 60.

The middle field order may include a wake-up order and/or an operation order adapted to be received by the device 10-40. The middle field order may for example be a blinking order, an acquisition order, or a sensing order. The device 10-40 then includes a light emitter 20 configured to perform a blinking sequence in response to the blinking order.

A method for managing stock of a shelf of a salespoint, as illustrated by way of a non-limiting example in FIG. 3, comprises the following steps:

S1: receiving, by a communication module, a far field order sent via far field radio communication by a base station 100, wherein said communication module is adapted to be fixed to a shelf;

S2: sending, by the communication module, a near field order via near field radio communication to at least one device 10-40 located within a transmission range of said communication module;

S3: receiving, by said at least one device 10-40, the near field order; and

S4: performing, by said at least one device 10-40, an action in response to the near field order.

This method may be performed by a system according to any of the examples and embodiments disclosed above, and presents substantially the same advantages as the advantages developed above regarding the system. More particularly, this method is performed without necessitating any dedicated programming or setting up, and allows an efficient stock management with a reduced energy consumption.

The transmission range of the communication module may be comprised between 1 and 10 meters, preferably between 4 and 7 meters.

An action performed in step S4 may comprise emitting, by at least one light emitter 20, light forming a signal corresponding to a blinking sequence which is specific to said light emitter 20 and allows identification of the light emitter 20. The method further comprises a step S5 of visually acquiring, by a camera 30, said blinking sequence.

The method may further comprise a step of visually acquiring, by said camera 30, images of a shelf and/or a shelf support 70 located in the field of view of the camera 30, more particularly in response to a near field order corresponding to an acquisition order. The camera 30 may thus detect a near-empty or an empty space on a shelf support 70 located in the field of view of the camera 30, which corresponds to a stock shortage area.

This method, comprising acquisition by the camera 30 of a blinking sequence of the light emitter 20 and of images of the shelf support 70, allows identification of the light emitter 20 adapted to perform the blinking sequence in response to the reception of the blinking order, more particularly allows identification of a spacer 60 in which the light emitter 20 is integrated.

As illustrated for example in FIG. 3, the method may further comprise a step S6 of receiving, by an identification unit, the blinking sequence acquired by the camera 30, and a step S7 of identifying, by the identification unit, the light emitter 20 corresponding to the acquired blinking sequence.

Said identification may be performed based on a correspondence table comprising a plurality of blinking sequences, wherein each blinking sequence is associated with a respective light emitter 20 in said correspondence table. In addition, or as an alternative, each blinking sequence may be associated with a respective ESL 10 or with a respective spacer 60 in which the light emitter 20 is integrated, the method thus allowing respectively ESL 10 or spacer 60 identification.

The nature and/or position of the out-of-stock article can thus be determined, based on the nature and position of the article associated with the identified light emitter 20, and based on the position of the detected stock shortage area detected by the camera 30.

The method may further comprise a step of generating an alert if a stock shortage risk is determined. The alert may indicate a position and/or a nature of the article to replenish, based on the determined nature and/or position of the out-of-stock article.

The method may further comprise a step of sending, by a middle field access point 200, a middle field order via middle field radio communication to at least one device 10-40 located within a transmission range of said middle field access point 200. The transmission range of the middle field access point 200 may be comprised between 10 and 80 meters, preferably between 30 and 50 meters. Such a middle field order allows instantaneous communication with the devices 10-40.

The method may further comprise a step S10 of detecting, by a person sensor 40, an object or a person obstructing the light emitter 20 of the spacer 60. More particularly, the detecting may be performed by the person sensor 40 in response to a near field order corresponding to a sensing order sent by the communication module.

The communication module is adapted to trigger the blinking sequence of the light emitter 20 according to an output of the person sensor 40. More specifically, the communication module may be adapted to send the near field order according to the far field order and to the output of the person sensor.

Figure 4:
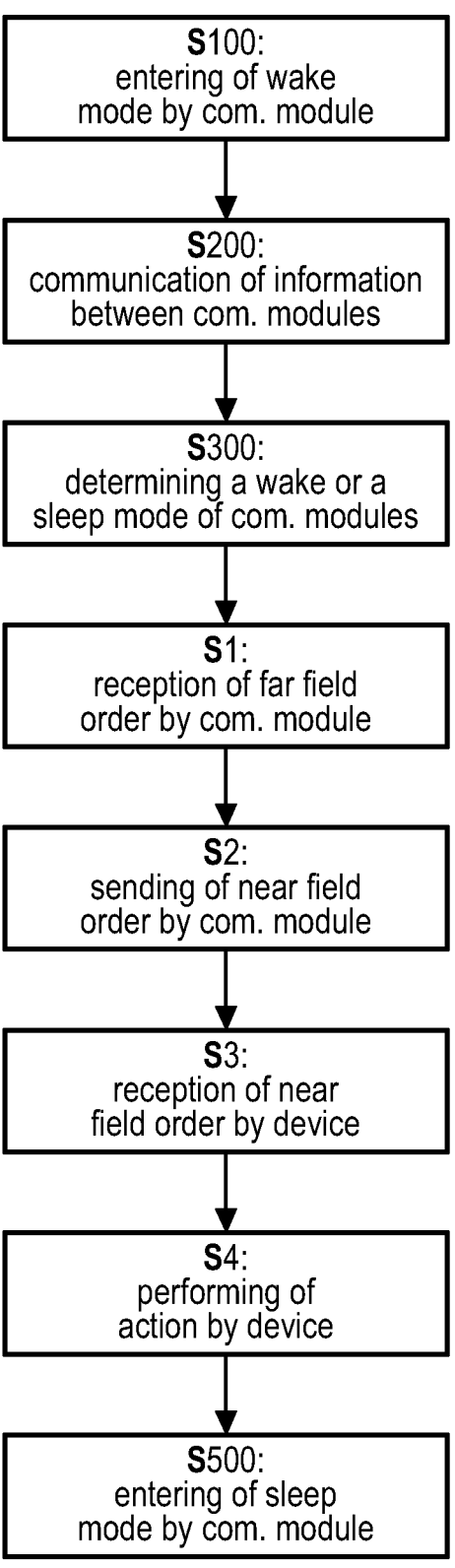
FIG. 4 is a block diagram of a method for managing stock of a shelf of a salespoint according to an embodiment of the invention, wherein the method further comprises entering a wake-up mode and a sleep mode by the communication module.

The method, as illustrated by way of a non-limiting example in FIG. 4, may further comprise the following steps:

S100: entering, by the communication module, a wake mode at a predetermined wake instant, wherein the steps S1 of receiving the far field order and S2 of sending the near field order are performed by the communication module having entered the wake mode; and S500: entering, by the communication module, a sleep mode at a predetermined time interval after the predetermined wake instant, or after the device 10-40 has performed an operation.

Such an alternance of the communication module between sleep and wake mode allows to further reduce the energy consumption of the system.

The method may further comprise the following steps:

S200: communicating information, between a plurality of communication modules located within a transmission range from each other; and S300: determining which communication module(s) among said plurality of communication modules should be in a wake or in a sleep mode, depending on the communicated information, the received far field order and/or the near field order to send.

Such a communication allows to further reduce energy consumption of the system, as the communication modules can determine which communication module should send which near field orders, and which device 10-40 should be woken and made to perform which operations.

In a first example, the near field order is broadcast by the communication module to all devices 10-40 located within the transmission range of said communication module. In a second example, which is compatible with the first example, the near field order is selectively unicast or multicast by the communication module to one or several device(s) 10-40 among the devices 10-40 located within the transmission range of said communication module. Thus, the near field order may be transmitted to all devices 10-40 within the transmission, or to a selection of at least one device located within the transmission range.

In a first embodiment, which is illustrated by way of a non-limiting example in FIG. 5, the method comprises the following steps, performed successively:

S21: sending, by the communication module, a wake-up order via near field radio communication to the at least one device 10-40;

S31: receiving, by the at least one device 10-40, the wake-up order;

S41: entering, by the at least one device 10-40, a wake mode, in response to the wake-up order;

S22: sending, by the communication module, an operation order via near field radio communication to the at least one device 10-40;

S32: receiving, by the at least one device 10-40, the operation order; and

S42: performing, by the at least one device 10-40, a corresponding operation, in response to the operation order.

The device 10-40 is thus configured to enter the wake mode in response to a wake-up order, for example a near field order corresponding to a wake-up order sent by the communication module.

The steps S21 and S22 are included in step S2, the near field order comprising at least one wake-up order and at least one operation order. Similarly, the steps S31 and S32 are included in step S3. Similarly, the step S41 and S42 are included in step S4, the device 10-40 performing at least an action consisting in entering a wake mode, and an action consisting in performing at least one given operation.

In a second embodiment, which is illustrated by way of a non-limiting example in FIG. 6, the method comprises the following steps, performed successively:

S101: entering, by the communication module and the at least one device 10-40, a wake mode at substantially a same predetermined wake instant;

S22: sending, by the communication module, an operation order via near field radio communication to the at least one device 10-40, substantially at said predetermined wake instant;

S32: receiving, by the at least one device 10-40, said operation order, substantially at said predetermined wake instant; and S42: performing, by the at least one device 10-40, a corresponding operation, in response to the operation order.

The at least one device 10-40 and the communication module are thus configured to respectively enter a wake mode at substantially a same predetermined wake instant. This method, in which the device 10-40 and the communication module wake up at synchronized instants to communicate, allows to further reduce energy consumption. Steps S22, S32 and S42 may respectively be included in steps S2, S3 and S4.

The method may further comprise the following steps, performed after step S22 and before step S32:

S23: entering, by the at least one device 10-40, the wake mode at periodic times spaced by a predetermined time interval; and S24: re-sending, by the communication module, the operation order, during a period of time which is equal to or greater than the predetermined time interval.

Step S23 may be included in step S2. The operation order may be re-sent in step S24 by the communication module until the corresponding operation is performed by the device 10-40.

The invention claimed is:

1. A system for managing stock of a salespoint shelf, comprising:

a communication module configured to be fixed to a shelf of the salespoint and comprising a far-field radio transceiver and a near-field radio transceiver; and at least one device located within a transmission range of the communication module;

wherein the communication module and the at least one device are configured to enter a wake mode substantially simultaneously at a predetermined wake instant;

wherein the communication module is further configured to receive a far-field order via the far-field radio transceiver, and to send, at substantially the predetermined wake instant, an operation order via the near-field radio transceiver; and wherein the at least one device is further configured to receive the operation order substantially at the predetermined wake instant, and to perform a corresponding operation in response to the operation order; wherein, if the at least one device does not receive the operation order at the predetermined wake instant, the at least one device is configured to enter the wake mode at periodic times spaced by a predetermined time interval; and wherein the communication module is configured to retransmit the operation order for a period of time equal to or greater than the predetermined time interval.

2. The system of claim 1, wherein the communication module is integrated in a camera, the camera being configured to be fixed to the shelf.

3. The system of claim 2, wherein the camera is configured to visually acquire an image of at least one of the at least one device.

4. The system of claim 2, wherein the communication module is integrated in a spacer configured to be fixed to a shelf support so as to delimit a column of the shelf support.

5. The system of claim 1, wherein at least one of the at least one device is integrated in a spacer configured to be fixed to a shelf support so as to delimit a column of the shelf support.

6. The system of claim 1, wherein the at least one device comprises at least one of: an Electronic Shelf Label (ESL), a light emitter integrated in a spacer, a sensor, and a camera.

7. A method for managing stock of a salespoint shelf, comprising:

receiving, by a communication module fixed to a shelf of the salespoint, a far-field order sent via far-field radio communication by a base station;

entering, by the communication module and at least one device located within a transmission range of the communication module, a wake mode substantially simultaneously at a predetermined wake instant;

sending, by the communication module, an operation order via near-field radio communication to the at least one device substantially at the predetermined wake instant;

receiving, by the at least one device, the operation order substantially at the predetermined wake instant; and performing, by the at least one device, an operation in response to the operation order; wherein, if the at least one device does not receive the operation order at the predetermined wake instant, the at least one device enters the wake mode at periodic times spaced by a predetermined time interval; and wherein the communication module retransmits the operation order for a period of time equal to or greater than the predetermined time interval.

8. The method of claim 7, wherein the transmission range of the communication module is between 1 meter and 10 meters.

9. The method of claim 7, wherein the operation performed in response to the operation order comprises emitting, by at least one light emitter, light forming a signal corresponding to a blinking sequence uniquely associated with the light emitter, and wherein the method further comprises visually acquiring, by a camera, the blinking sequence.

10. The method of claim 9, further comprising receiving, by an identification unit, the blinking sequence acquired by the camera, and identifying, by the identification unit, the light emitter corresponding to the acquired blinking sequence based on a correspondence table that maps a plurality of blinking sequences to respective light emitters.

11. The method of claim 7, further comprising sending, by a middle-field access point, a middle-field order via middle-field radio communication to the at least one device.

12. The method of claim 7, wherein receiving the far-field order and sending the near-field order are performed by the communication module after the communication module has entered the wake mode; and further comprising entering, by the communication module, a sleep mode at a predetermined time interval after the predetermined wake instant or after the at least one device has performed the operation.

13. The method of claim 7, further comprising: communicating information between a plurality of communication modules located within transmission range of one another; and determining, based on the communicated information, the received far-field order, or the near-field order to send, which communication module among the plurality of communication modules should be in a wake mode and which should be in a sleep mode.

14. The method of claim 7, wherein the near-field order is a broadcast signal sent by the communication module to all devices located within the transmission range of the communication module.

15. The method of claim 7, wherein the near-field order is a unicast or a multicast signal sent by the communication module to one or more selected devices located within the transmission range of the communication module.

16. The method of claim 7, further comprising, successively: sending, by the communication module, a wake-up order via near-field radio communication to the at least one device; receiving, by the at least one device, the wake-up order; and entering, by the at least one device, the wake mode in response to the wake-up order.

* * * * *